(12) United States Patent
Jeong et al.

(10) Patent No.: US 9,258,785 B2
(45) Date of Patent: Feb. 9, 2016

(54) UPLINK SIGNAL TRANSMITTING AND RECEIVING METHOD AND DEVICE IN A WIRELESS COMMUNICATION SYSTEM

(71) Applicant: Samsung Electronics Co., Ltd., Suwon-si, Gyeonggi-do (KR)

(72) Inventors: Su-Ryong Jeong, Yongin-si (KR); Tae-Young Kim, Seongnam-si (KR); Jeong-Ho Park, Seoul (KR); Ji-Yun Seol, Seongnam-si (KR); Hyun-Kyu Yu, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/382,936

(22) PCT Filed: Mar. 5, 2013

(86) PCT No.: PCT/KR2013/001766
§ 371 (c)(1),
(2) Date: Sep. 4, 2014

(87) PCT Pub. No.: WO2013/133606
PCT Pub. Date: Sep. 12, 2013

(65) Prior Publication Data
US 2015/0215873 A1 Jul. 30, 2015

(30) Foreign Application Priority Data
Mar. 5, 2012 (KR) ........................ 10-2012-0022369

(51) Int. Cl.
*H04W 52/24* (2009.01)
*H04W 52/14* (2009.01)
(Continued)

(52) U.S. Cl.
CPC ........... *H04W 52/146* (2013.01); *H04B 7/0408* (2013.01); *H04W 52/243* (2013.01); *H04W 52/42* (2013.01); *H04W 52/16* (2013.01)

(58) Field of Classification Search
CPC .......................... H04W 52/146; H04W 52/243
USPC ......... 455/522, 69, 63.1, 67.13, 452.1, 452.2, 455/509, 67.11
See application file for complete search history.

(56) References Cited

U.S. PATENT DOCUMENTS

| 2002/0196766 A1* | 12/2002 | Hwang et al. | H04W 52/56 370/342 |
| 2004/0203981 A1* | 10/2004 | Budka et al. | H04W 52/265 455/522 |

(Continued)

FOREIGN PATENT DOCUMENTS

| KR | 10-2011-0062473 A | 6/2011 |
| KR | 10-2011-0067317 A | 6/2011 |
| KR | 10-2011-0090646 A | 8/2011 |

OTHER PUBLICATIONS

Novakovic, "Integration of Transmit Power Control, Transmit Diversity and Receive Beamforming", XP010553728, 2001 IEEE International Conference on Communications, Jun. 11, 2001, pp. 2307-2311, vol. 7.

(Continued)

*Primary Examiner* — John J Lee
(74) *Attorney, Agent, or Firm* — Jefferson IP Law, LLP

(57) ABSTRACT

A method and an apparatus for transmitting and receiving an uplink signal by a mobile terminal in a wireless communication system are provided. The first mobile terminal includes a receiver configured to receive, from a base station, a power control variable determined based on an interference value for a first receive beam used in order to receive an uplink signal of the first mobile terminal from among a plurality of receive beams of the base station, to receive, from the base station, neighboring receive beam allocation data indicating whether any of the receive beams in the plurality of receive beams, different from the first receive beam, is being used for uplink signal reception, to determine an uplink transmit power value based on the received power control variable and neighboring receive beam allocation data, and to transmit an uplink signal to the base station by using the determined uplink transmit power value.

28 Claims, 8 Drawing Sheets

(51) Int. Cl.
  *H04B 7/04* (2006.01)
  *H04W 52/42* (2009.01)
  *H04W 52/16* (2009.01)

(56) References Cited

U.S. PATENT DOCUMENTS

2007/0189047 A1* 8/2007 Lee et al. ............ H04W 52/243
                                                    363/62
2010/0056140 A1* 3/2010 Hafeez ................ H04W 52/243
                                                    455/434
2010/0331036 A1    12/2010 You et al.
2011/0070918 A1*  3/2011 Hafeez ................ H04B 7/0452
                                                    455/522

OTHER PUBLICATIONS

Chang et al., "Joint Transmitter Receiver Diversity for Efficient Space Division Multiaccess", XP011064360, IEEE Transactions on Wireless Communication, Jan. 1, 2002, vol. 1, No. 1.

* cited by examiner

|  | i-4 | i-3 | i-2 | i-1 | i | i+1 | i+2 | i+3 | i+4 |
|---|---|---|---|---|---|---|---|---|---|
| CH #1 | 0 | 1 | 0 | 0 | MOBILE TERMINAL A | 0 | 0 | 0 | 0 |
| CH #2 | 0 | 1 | 0 | 0 | MOBILE TERMINAL B | 0 | 1 | 0 | 0 |
| CH #3 | 0 | 0 | 0 | 0 | MOBILE TERMINAL C | 0 | 1 | 0 | 0 |
| CH #4 |  |  |  |  |  |  |  |  |  |

<NEIGHBORING RECEPTION BEAM-CHANNEL-SPECIFIC ALLOCATION INFORMATION>

<MAP FOR TERMINALS CONNECTED TO $I^{TH}$ RECEPTION BEAM>

| MOBILE TERMINAL A | CH #1 | ALLOCATION INFORMATION | | | | | |
|---|---|---|---|---|---|---|---|
| 0 | 1 | 0 | 0 | 0 | 0 | 0 | 0 |

| MOBILE TERMINAL B | CH #2 | ALLOCATION INFORMATION | | | | | |
|---|---|---|---|---|---|---|---|
| 0 | 1 | 0 | 0 | 0 | 1 | 0 | 0 |

| MOBILE TERMINAL C | CH #3 | ALLOCATION INFORMATION | | | | | |
|---|---|---|---|---|---|---|---|
| 0 | 0 | 0 | 0 | 0 | 1 | 0 | 0 |

FIG.4

UPLINK SIGNAL TRANSMITTING AND RECEIVING METHOD AND DEVICE IN A WIRELESS COMMUNICATION SYSTEM

CROSS-REFERENCE TO RELATED APPLICATION(S)

This application is a U.S. National Stage application under 35 U.S.C. §371 of an International application filed on Mar. 5, 2013 and assigned application number PCT/KR2013/001766, which claims the benefit under 35 U.S.C. §365(b) of a Korean patent application filed on Mar. 5, 2012 in the Korean Intellectual Property Office and assigned Serial number 10-2012-0022369, the entire disclosure of which is hereby incorporated by reference.

TECHNICAL FIELD

The present disclosure relates to a method and an apparatus for transmitting and receiving an uplink signal in a wireless communication system. More particularly, the present disclosure relates to a method and an apparatus in which a mobile terminal transmits a signal by controlling an uplink transmission power based on neighboring reception beam allocation information in a wireless communication system using beamforming.

BACKGROUND

In order to meet an ever-increasing demand for wireless data traffic, wireless communication systems are developing to support a higher data transmission rate. The $4^{th}$ generation (4G) system, which is starting to be commercialized, has been developed mainly to improve spectral efficiency in order to increase a data transmission rate. However, it has become difficult to satisfy an explosively-increasing demand for wireless data traffic solely by the spectral efficiency improvement technology.

To address the above issue, there is a method for using a very wide frequency band. A frequency band used in the current mobile cellular system is generally lower than 10 GHz, and it is very difficult to secure a wide frequency band. Therefore, there is a need to secure broadband frequencies in a higher frequency band.

However, as an operation frequency band for wireless communication becomes higher, a propagation path loss increases. Thus, a wave propagation distance decreases, and a service coverage decreases accordingly. Beamforming is a technology for addressing this issue, that is, for reducing a propagation path loss and increasing a wave propagation distance.

Beamforming includes transmission beamforming performed in a transmitter and reception beamforming performed in a receiver. The transmission beamforming concentrates a wave propagation region in a specific direction by using a plurality of antennas. Herein, a group of a plurality of antennas may be referred to as an antenna array, and each antenna included in the antenna array may be referred to as an array element.

When transmission beamforming is used, a signal transmission distance is increased and a signal is hardly transmitted in directions apart from a corresponding direction. Therefore, an interference with respect to a neighboring cell is greatly reduced.

Meanwhile, the reception beamforming uses an antenna array in a receiver, and concentrates a wave reception-possible region in a specific direction to increase a reception distance of a signal. The reception beamforming excludes a signal received in other directions than a corresponding direction from reception signals to provide a gain of blocking an interference signal.

In a wireless communication system using either the transmission beamforming or the reception beamforming, an absolute amount of a neighboring cell interference is reduced, such that the use of one or more additional beams in a corresponding cell becomes possible. As such, a technique for increasing a transmission capacity by simultaneously transmitting or receiving one or more beams in different directions in one cell or base station is referred to as spatial/space division multiple access (SDMA).

When beamforming and SDMA are used, an uplink power control method needs to differ from an uplink power control method used in previous cellular environments but in the related art, there is no uplink power control method suitable for a wireless communication system using beamforming and SDMA.

Therefore, a need exists for a method and an apparatus in which a mobile terminal transmits a signal by controlling an uplink transmission power based on neighboring reception beam allocation information in a wireless communication system using beamforming.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an uplink signal transmission and reception method and apparatus in a wireless communication system.

Another aspect of the present disclosure is to provide a method and an apparatus in which a mobile terminal transmits a signal by controlling an uplink transmission power based on neighboring reception beam allocation information in a wireless communication system using beamforming.

Moreover, another aspect of the present disclosure is to provide a method and an apparatus in which a mobile terminal effectively controls an uplink power, considering neighboring reception beam allocation information and a power control variable calculated based on a reception gain for an angle with respect to a neighboring reception beam in uplink power control in a wireless communication system using beamforming.

In accordance with an aspect of the present disclosure, a method for transmitting an uplink signal by a first mobile terminal in a wireless communication system is provided. The method includes receiving from a base station, a power control variable determined based on an interference value for a first reception beam used for reception of the uplink signal of the first mobile terminal among multiple reception beams of the base station, receiving from the base station, neighboring reception beam allocation information indicating whether to use other reception beams different from the first reception beam among the multiple reception beams for reception of the uplink signal, determining an uplink transmission power value based on the received power control variable and the received neighboring reception beam allocation information, and transmitting the uplink signal to the base station by using the determined uplink transmission power value.

In accordance with another aspect of the present disclosure, a method for receiving an uplink signal by a base station in a wireless communication system is provided. The method includes determining a power control variable based on an interference value for a first reception beam used for reception of the uplink signal of a first mobile terminal among multiple reception beams of the base station, transmitting the determined power control variable to the first mobile terminal, transmitting to the first mobile terminal, neighboring reception beam allocation information indicating whether to use other reception beams different from the first reception beam among the multiple reception beams for reception of the uplink signal, and receiving the uplink signal transmitted using an uplink transmission power value from the first mobile terminal, in which the uplink transmission power value is determined based on the transmitted power control variable and neighboring reception beam allocation information.

In accordance with another aspect of the present disclosure, a first mobile terminal in a wireless communication system is provided. The first mobile terminal includes a receiver configured to receive from a base station, a power control variable determined based on an interference value for a first reception beam used for reception of an uplink signal of the first mobile terminal among multiple reception beams of the base station and neighboring reception beam allocation information indicating whether to use other reception beams different from the first reception beam among the multiple reception beams for reception of the uplink signal, a controller configured to determine an uplink transmission power value based on the received power control variable and the received neighboring reception beam allocation information, and a transmitter configured to transmit the uplink signal to the base station by using the determined uplink transmission power value.

In accordance with another aspect of the present disclosure, a base station in a wireless communication system is provided. The base station includes a controller configured to determine a power control variable based on an interference value for a first reception beam used for reception of an uplink signal of a first mobile terminal among multiple reception beams of the base station and to generate neighboring reception beam allocation information indicating whether to use other reception beams different from the first reception beam among the multiple reception beams for reception of the uplink signal, a transmitter configured to transmit the determined power control variable and the neighboring reception beam allocation information to the first mobile terminal, and a receiver configured to receive the uplink signal transmitted using an uplink transmission power value from the first mobile terminal, in which the uplink transmission power value is determined based on the transmitted power control variable and neighboring reception beam allocation information.

The present disclosure performs power control, taking an inner cell interference in a wireless communication system using beamforming, thereby predicting an uplink interference and improving the accuracy of uplink power control based on the predicted interference. Moreover, the present disclosure enhances uplink transmission performance along with the improvement in the accuracy of uplink power control.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 illustrates a second configuration of neighboring reception beam allocation information according to an embodiment of the present disclosure;

Throughout the drawings, it should be noted that like reference numbers are used to depict the same or similar elements, features, and structures.

DETAILED DESCRIPTION

Figure 1:
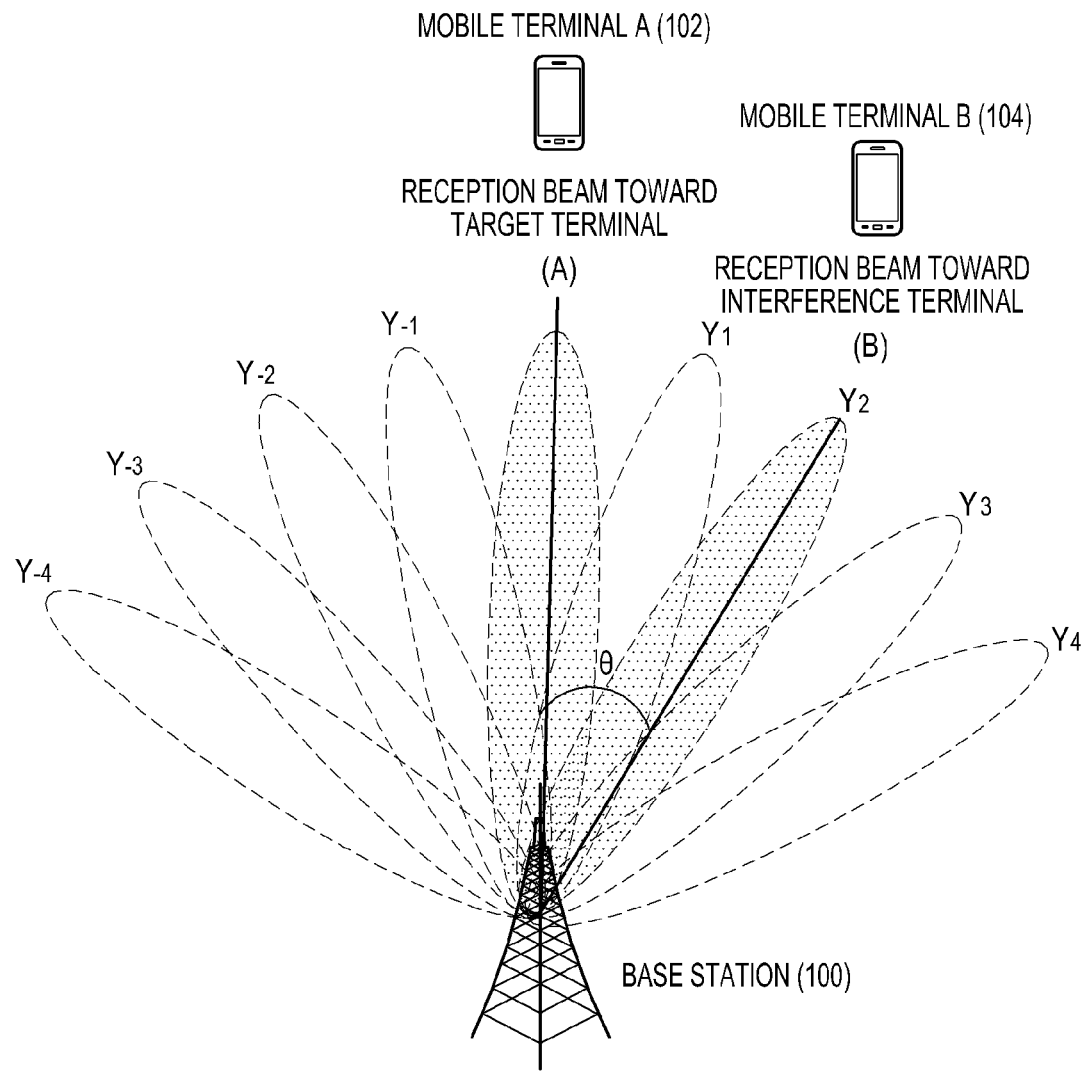
FIG. 1 illustrates a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Hereinafter, various embodiments of the present disclosure will be described in relation to the accompanying drawings. In the following description, a detailed description of known functions and configurations incorporated herein will be omitted when it may obscure the subject matter of the present disclosure. Terms used herein are defined based on functions in the present disclosure and may vary according to users, operators' intention or usual practices. Therefore, the definition of the terms should be made based on contents throughout the specification.

Embodiments of the present disclosure propose a method and an apparatus for transmitting and receiving an uplink signal in a wireless communication system. More specifically, embodiments of the present disclosure propose a method and an apparatus for securing stable link performance by performing power control corresponding to a beam interference allocated through an uplink in a wireless communication system using beamforming.

Before an embodiment of the present disclosure is described, an uplink power control equation of the related art will be described.

The uplink power control equation of the related art is determined based on path loss compensation, noise and interference (NI) compensation, and a target signal to interference-plus-noise ratio (SINR) or required SINR as expressed in Equation 1.

$$P_{Tx}=L+\text{NI}+\text{SINR}_{Target/Required} \quad \text{Equation 1}$$

where $P_{Tx}$ represents a transmission power of a mobile terminal, L represents the path loss, NI represents the noise and interference, and $\text{SINR}_{Target/Required}$ represents the target SINR or required SINR.

However, when beamforming is used in the wireless communication system, neighboring cell interference is greatly reduced, such that the importance of power control using Equation 1 is degraded. On the other hand, when spatial/space division multiple access (SDMA) is used in the wireless communication system, additional beam use in a cell and corresponding interference occur, requiring additional power control for another beam in the cell. For the additional power control, Equation 2 may be used.

$$P_{Tx}=L+(I\_\text{inter}+I\_\text{intra}+P\text{noise})_{linear \to dBm}+ \text{SINR}_{Target/Required} \quad \text{Equation 2}$$

where I_Inter represents interference caused by mobile terminals included in a neighboring cell, I_Intra represents interference caused by a mobile terminal included in the same cell, and Pnoise represents the strength of white noise. In Equation 2, ( ) linear→dBm represents conversion of a linear value in parentheses into dBm.

Values of I_Inter and I_intra used in Equation 2 may be an average value of interferences between neighboring cells measured for a period of time in each base station and an average value of interferences in the same cell measured for the period of time in the base station. However, when an additional beam is used in the same cell as mentioned above, inter-beam interference occurs, which may largely change with simultaneously allocated reception beams. Thus, an embodiment of the present disclosure proposes a method for performing accurate uplink power control by accurately predicting a value of the inter-beam interference caused by the use of the additional beam in the same cell.

To this end, a power control equation expressed as Equation 3 may be used. Equation 3, unlike Equation 2 described above, allows power control to be performed additionally using a change in an interference caused by interference between beams in the same cell.

$$P_{Tx}=L+(I\_\text{inter}+I\_\text{intra}+P\text{noise})_{linear \to dBm}+\Delta I\_\text{intra}+ \text{SINR}_{Target/Required} \quad \text{Equation 3}$$

where $\Delta I\_\text{intra}$ represents a change in an interference caused by interference between beams in the same cell at a particular point in time. $\Delta I\_\text{intra}$ may be determined based on an angle between reception beams with respect to transmission signals transmitted at the same time by respective mobile terminals in the same frame. For further description, FIG. 1 will be provided below.

FIG. 1 illustrates a wireless communication system according to an embodiment of the present disclosure.

Referring to FIG. 1, for example, a base station 100 exists in the center of a cell, and a mobile terminal A 102 transmits a signal toward a reception beam A of the base station 100 and the base station 100 receives the signal by using the reception beam A. A mobile terminal B 104 may transmit a signal toward another reception beam B of the base station 100 and the base station 100 may receive the signal from the mobile terminal B 104 by using the reception beam B. In this case, an angle between reception beams with respect to the transmission signals of the respective mobile terminals A and B 102 and 104 is θ.

Figure 2:
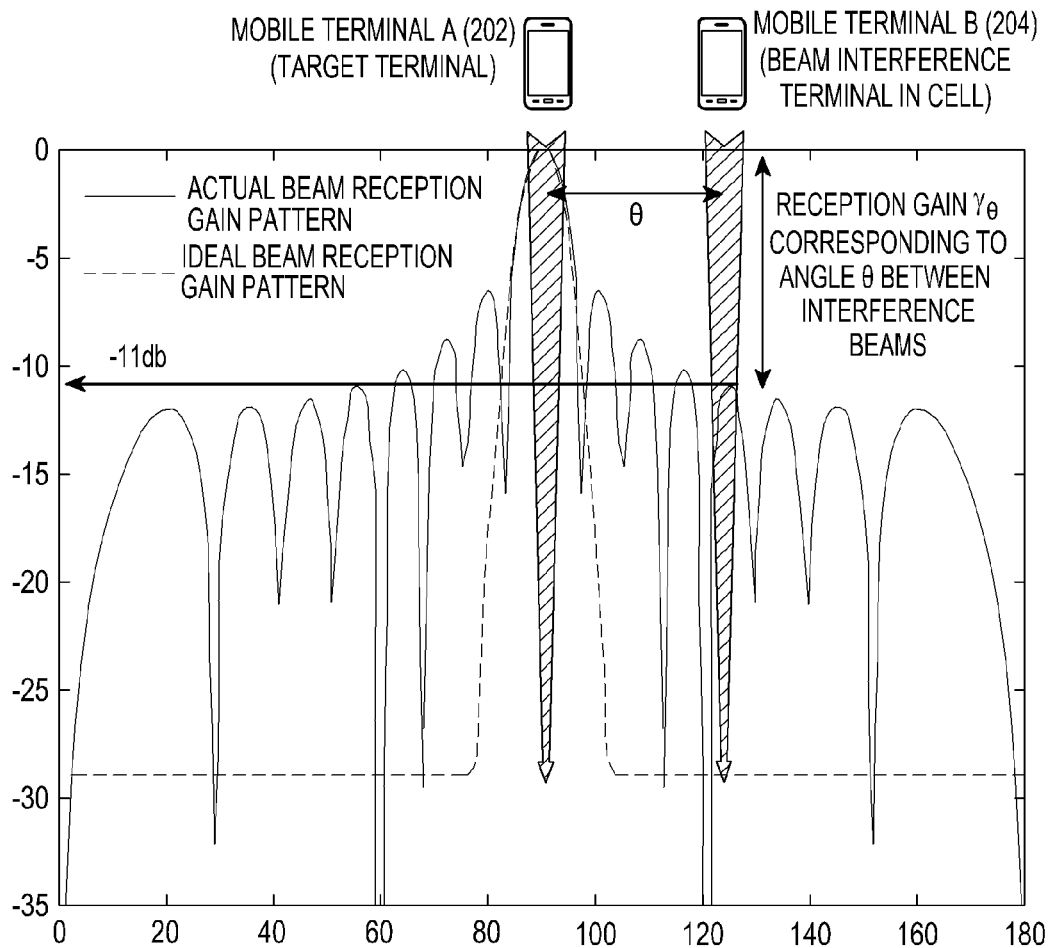
FIG. 2 is a graph illustrating a gain pattern of a reception beam of a base station in a wireless communication system according to an embodiment of the present disclosure.

A relationship between a reception gain in the reception beam A and the reception beam B is as illustrated in FIG. 2.

FIG. 2 is a graph illustrating a gain pattern for a reception beam of a base station in a wireless communication system according to an embodiment of the present disclosure.

Referring to FIG. 2, when a mobile terminal A 202 transmits a signal to a base station and the base station receives the signal of the mobile terminal A 202 through a reception beam A, and a mobile terminal B 204 transmits a signal to the base station and the base station 200 receives the signal of the mobile terminal B 204 through a reception beam B, then a reception gain for an angle θ between the reception beam A and the reception beam B is determined by an interference that is reduced by −11 dB.

For example, if the mobile terminal A 202 and the mobile terminal B 204 transmit signals with the same power at the same distance, the signal of the mobile terminal B 204 is received with a signal strength that is −11 dB less than an actual transmission signal strength of the mobile terminal B 204 by using the reception beam B of the base station 200 for receiving the signal of the mobile terminal A 202.

As such, if signals transmitted at the same time from two different mobile terminals are received through two different reception beams, an interference that influences the mobile terminals is inversely proportional to an angle between the reception beams. For example, as the angle increases, an interference decreases and as the angle decreases, the interference increases.

Thus, in an embodiment of the present disclosure, for a signal transmitted toward a reception beam apart from a corresponding reception beam, a power control variable is determined using a corresponding angle. The power control variable may be, for example, $Y_{-4}, Y_{-3}, Y_{-2}, Y_{-1}, Y_1, Y_2, Y_3, Y_4$ as expressed in Equation 4.

$$Y_n = f(\theta_n) \quad \text{Equation 4}$$

where $\Psi_n$ represents a power control variable (for example, a difference between interferences of neighboring reception beams) determined based on a reception beam of another reception beam distant by n from a corresponding reception beam, and $\theta_n$ represents an angle between the corresponding reception beam and the another reception beam.

In an embodiment of the present disclosure, a power control variable determined using Equation 4 is used for uplink power control of a mobile terminal. To this end, the mobile terminal receives allocation information for a mobile terminal that transmits a signal toward a neighboring reception beam or information about a corresponding reception beam (hereinafter, referred to as 'neighboring reception beam allocation information') in a frame in which the mobile terminal transmits the signal.

The neighboring reception beam allocation information may have three configurations that will be described with reference to FIGS. 3, 4, and 5.

Figure 3:
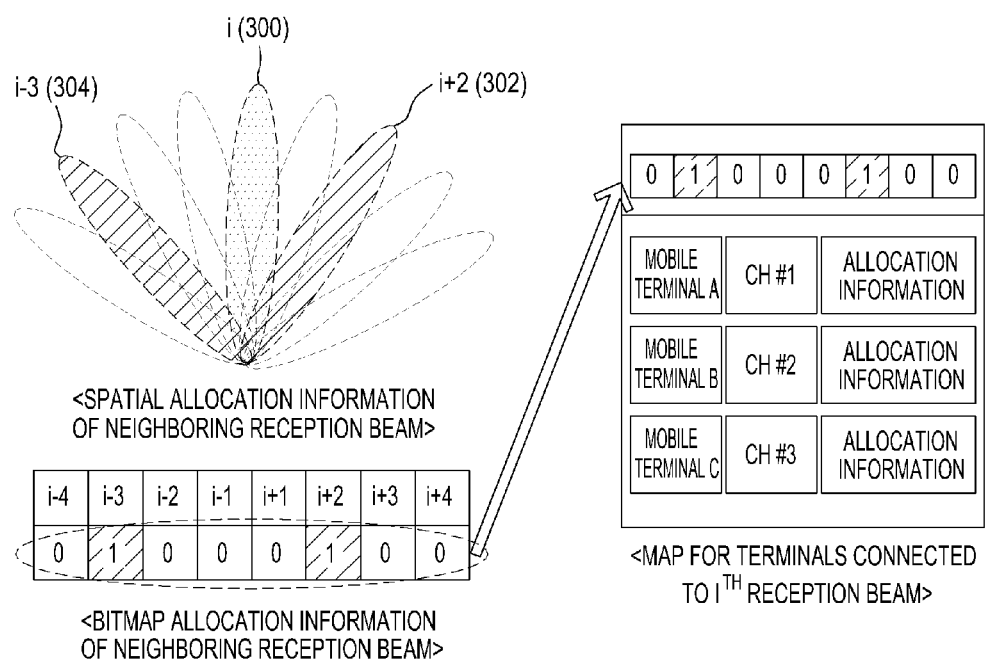
FIG. 3 illustrates a first configuration of neighboring reception beam allocation information according to an embodiment of the present disclosure.

FIG. 3 illustrates a first configuration of neighboring reception beam allocation information according to an embodiment of the present disclosure.

The neighboring reception beam allocation information proposed in an embodiment of FIG. 3 includes information indicating whether in the same frame as a frame in which a mobile terminal transmits an uplink signal for a corresponding reception beam, there exist mobile terminals that transmit uplink signals corresponding to reception beams apart from the corresponding reception beam. The neighboring reception beam allocation information is transmitted through a broadcast channel or a certain part of resource allocation information (hereinafter, referred to as 'MAP') in the form of a bitmap to allow mobile terminals using the same reception beam to use the neighboring reception beam allocation information in common.

Referring to FIG. 3, if uplink signals corresponding to an $(i+2)^{th}$ reception beam 302 and an $(i-3)^{th}$ reception beam 304 are received together with an $i^{th}$ reception beam 300 in the same frame, information indicating whether to use neighboring reception beams of the $i^{th}$ reception beam 300 is generated as bitmap allocation information.

The base station arranges indices of reception beams (hereinafter, referred to as 'interference reception beams') determined to cause an interference greater than a threshold value for the $i^{th}$ reception beam 300 sequentially from the left or according to an arbitrary rule. For the indices of the interference reception beams, the base station sets 1 if a corresponding reception beam is used for signal reception in a frame in which the $i^{th}$ reception beam 300 is used, and otherwise, the base station sets 0. For example, the base station generates neighboring reception beam allocation information such that 1 or 0 is mapped to respective indices of reception beams apart from the $i^{th}$ reception beam 300 (i.e., an $(i-4)^{th}$ reception beam, an $(i-3)^{th}$ reception beam, an $(i-1)^{th}$ reception beam, an $(i+1)^{th}$ reception beam, an $(i+2)^{th}$ reception beam, an $(i+3)^{th}$ reception beam, and an $(i+4)^{th}$ reception beam).

In the embodiment of FIG. 3, since the $(i+2)^{th}$ reception beam 302 and the $(i-3)^{th}$ reception beam 304 are used in a frame in which the $i^{th}$ reception beam 300 is used for signal reception, neighboring reception beam allocation information is generated such that 1 is mapped to an index of the $(i+2)^{th}$ reception beam 302 and an index of the $(i-3)^{th}$ reception beam 304 and 0 is mapped to indices of the other reception beams.

Once the neighboring reception beam allocation information is set in the foregoing manner, the base station incorporates the neighboring reception beam into a corresponding part of the MAP (i.e., the $i^{th}$ broadcast channel or a region allocated to mobile terminals using the $i^{th}$ reception beam 300). The MAP also includes channel allocation information for mobile terminals using the $i^{th}$ reception beam 300.

By transmitting the MAP to mobile terminals using the $i^{th}$ reception beam 300, the base station allow all mobile terminals using the $i^{th}$ reception beam 300 to determine based on the neighboring reception beam allocation information included in the MAP in the form of a bitmap whether there is a mobile terminal transmitting a signal corresponding to a neighboring reception beam.

FIG. 4 illustrates a second configuration of neighboring reception beam allocation information according to an embodiment of the present disclosure.

In an embodiment of FIG. 4, unlike in the embodiment of FIG. 3, to allow each mobile terminal to directly recognize whether neighboring reception beams are used for an allocated channel, neighboring reception beam allocation information is generated for each mobile terminal. In this case, overhead of the MAP may increase, but each mobile terminal may accurately perform power control.

Referring to FIG. 4, a base station generates channel-specific neighboring reception beam allocation information for mobile terminals using an $i^{th}$ reception beam. The generated neighboring reception beam allocation information includes information indicating whether there exist mobile terminals that transmit uplink signals corresponding to neighboring reception beams for each channel.

For example, for a mobile terminal A that uses a first channel CH #1 and the $i^{th}$ reception beam, the base station generates neighboring reception beam allocation information in the form of a bitmap as information indicating whether there is a mobile terminal that transmits an uplink signal through a reception beam apart from the $i^{th}$ reception beam for the first channel CH #1.

For a mobile terminal B that uses a second channel CH #2 and the $i^{th}$ reception beam, the base station generates neighboring reception beam allocation information in the form of a bitmap as information indicating whether there is a mobile terminal that transmits an uplink signal through a reception beam apart from the $i^{th}$ reception beam for the second channel CH #2.

For a mobile terminal C that uses a third channel CH #3 and the $i^{th}$ reception beam, the base station generates neighboring reception beam allocation information in the form of a bitmap as information indicating whether there is a mobile terminal that transmits an uplink signal through a reception beam apart from the $i^{th}$ reception beam for the third channel CH #3.

The base station incorporates channel-specific neighboring reception beam allocation information for the respective mobile terminals A, B, and C into the MAP and transmits the channel-specific neighboring reception beam allocation information to the mobile terminals through the MAP.

Figure 5:
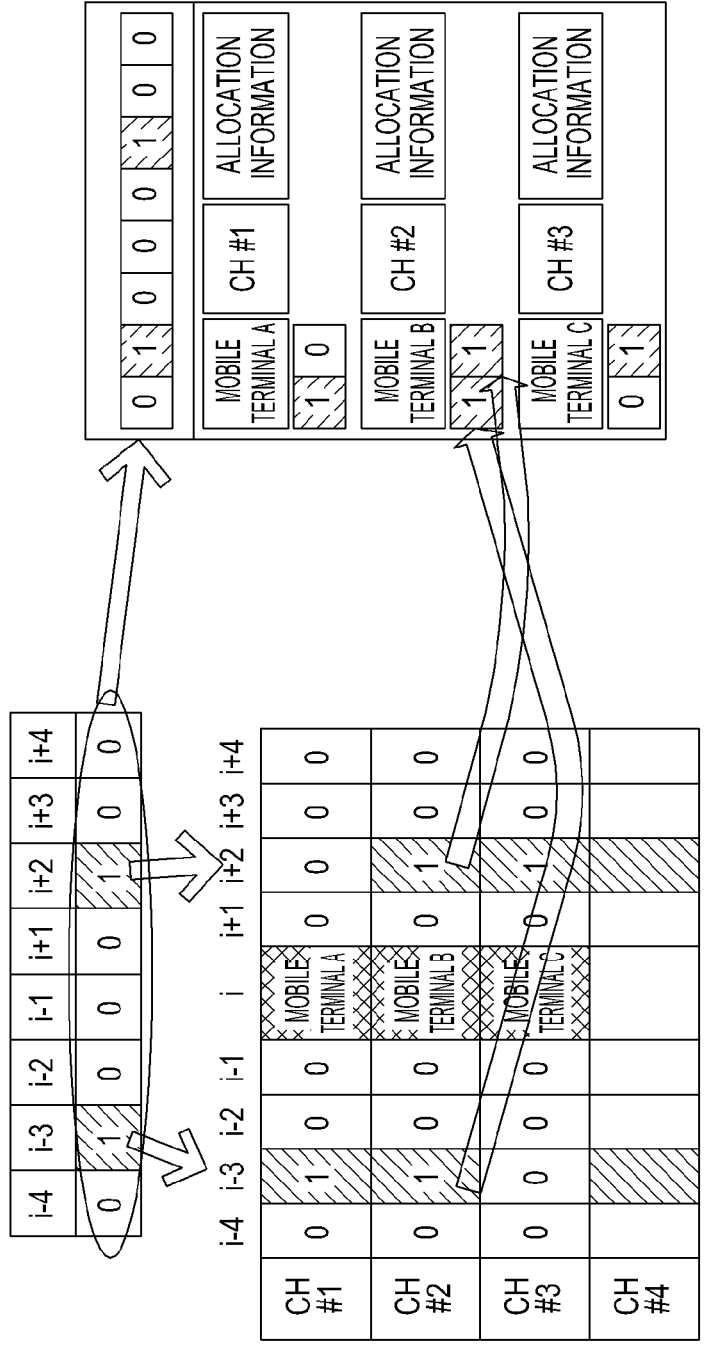
FIG. 5 illustrates a third configuration of neighboring reception beam allocation information according to an embodiment of the present disclosure.

FIG. 5 illustrates a third configuration of neighboring reception beam allocation information according to an embodiment of the present disclosure.

In an embodiment of FIG. 5, by using the first configuration and the second configuration of the neighboring reception beam allocation information together, the overhead of MAP transmission may be reduced.

Referring to FIG. 5, a base station generates first bitmap information indicating whether to use neighboring reception beams of the $i^{th}$ reception beam according to the first configuration of the neighboring reception beam allocation information. The base station also generates second bitmap information indicating whether to use neighboring reception beams for each channel according to the second configuration of the neighboring reception beam allocation information.

The base station incorporates the first bitmap information into a set position of the MAP. The base station incorporates information indicating whether to use a neighboring reception beam for each mobile terminal into the MAP based on the second bitmap information and transmits the information through the MAP. Thus, each mobile terminal having received the MAP may perform accurate power control for each channel while reducing overhead.

Thereafter, an uplink power control equation proposed in an embodiment of the present disclosure will be described.

An embodiment of the present disclosure proposes an uplink power control equation like Equation 5 based on a power control variable for each neighboring reception beam of Equation 4 provided above and the neighboring reception beam allocation information.

$$P_{Tx} = L + (I\_inter + I\_intra + Pnoise)_{linear \to dBm} + \Sigma \Psi_n S(n) + SINR_{Target/Required} \quad \text{Equation 5}$$

where $S(n)$ represents whether an $n^{th}$ neighboring reception beam is allocated.

As may be seen in Equation 5, through a process of multiplying a power control variable for each neighboring reception beam by information indicating whether the neighboring reception beam is allocated, if the neighboring reception beam is used in the same frame, a power control weight value $\Psi_n$ is multiplied for use in power control.

If $I\_inter + I\_intera + Pnoise$ of Equation 5 is replaced with NI representing interference inside and outside an existing cell, it may be expressed as Equation 6.

$$P_{TX} = L + NI + \Sigma \Psi_n S(n) + SINR_{Trarget/Required} \quad \text{Equation 6}$$

Comparing Equation 6 with Equation 2, it may be seen that in Equation 6, a power control weight value for a change in an interference between beams in the same cell is added to Equation 2.

To use Equation 6, a mobile terminal estimates a path loss L through downlink measurement and a base station transmits a time average noise and interference NI to mobile terminals in a cell through a broadcast channel. Moreover, $SINR_{Target/Required}$ is a certain value for use to determine a modulation coding scheme (MCS) level between the base station and the mobile terminal. Meanwhile, the mobile terminal transmits $\Psi_n$, which is a power control variable representing a difference in an interference for each neighboring reception beam, to each mobile terminal. $\Psi_n$ may be given as in Table 1.

TABLE 1

| Neighboring Reception Beam | i − 4 | i − 3 | i − 2 | i − 1 | i + 1 | i + 2 | i + 3 | i + 4 |
|---|---|---|---|---|---|---|---|---|
| $\Psi_n$ [dB] | 0 | 1 | 2 | 4 | 4 | 2 | 1 | 0 |

In Table 1, $\Psi_n$ corresponds to each of neighboring reception beams of the $i^{th}$ reception beam. Information provided in Table 1 may be used together with the neighboring reception beam allocation information configured as illustrated in FIGS. 3, 4, and 5. For example, if the neighboring reception beam allocation information has the configuration illustrated in FIG. 5, the information provided in Table 1 may be used to control a transmission power of each mobile terminal as described below. Referring to FIG. 5, since the mobile terminal A is allocated with the $(i-3)^{th}$ neighboring reception beam, $\Psi_n$ (i.e., 1 dB) corresponding to the $(i-3)^{th}$ neighboring reception beam in Table 1 is detected. The mobile terminal A increases a transmission power by 1 dB according to the detected $\Psi_n$, such that a target reception SINR (i.e., $SINR_{Target/Required}$) at the base station is satisfied.

The mobile terminal B is allocated with the $(i-3)^{th}$ neighboring reception beam and the $(i+2)^{th}$ neighboring reception beam at the same time, such that 1 dB and 2 dB corresponding to the $(i-3)^{th}$ neighboring reception beam and the $(i+2)^{th}$ neighboring reception beam, respectively, are detected in Table 1. The mobile terminal B increases a transmission power by a sum of the detected two values (i.e., 3 dB).

The mobile terminal C is allocated with the $(i+2)^{th}$ neighboring reception beam, such that 2 dB corresponding to the $(i+2)^{th}$ neighboring reception beam is detected from Table 1 and the mobile terminal C increases a transmission power by the detected 2 dB. As such, in an embodiment of the present disclosure, the mobile terminal may perform uplink power control, considering a power control variable $\Psi_n$ corresponding to an angle $\theta_n$ with respect to a neighboring reception beam and information $S(n)$ indicating whether a neighboring reception beam is used.

Hereinafter, operations of a base station according to an embodiment of the present disclosure will be described.

Figure 6:
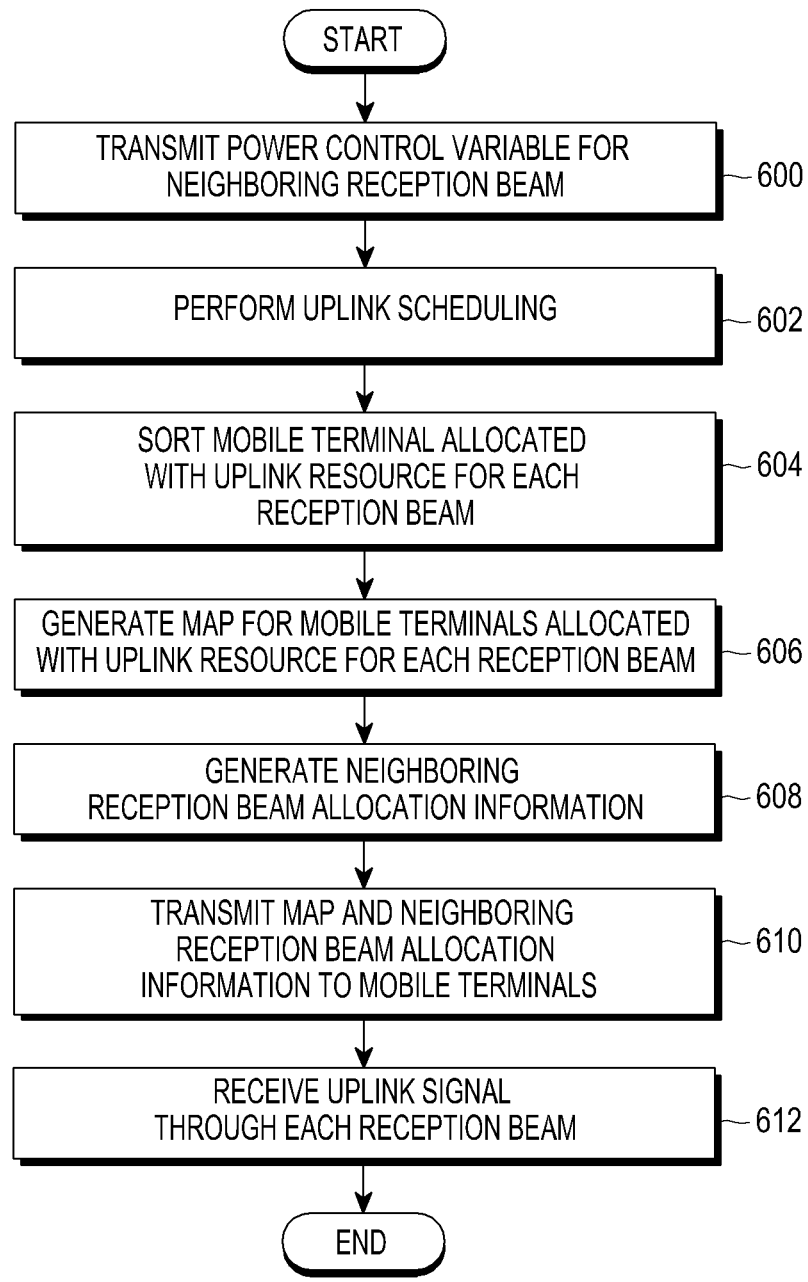
FIG. 6 is a flowchart illustrating a process of receiving an uplink signal at a base station in a wireless communication system according to an embodiment of the present disclosure.

FIG. 6 is a flowchart illustrating a process of receiving an uplink signal at a base station in a wireless communication system according to an embodiment of the present disclosure.

Referring to FIG. 6, at operation 600, the base station transmits a power control variable $\Psi_n$ for a neighboring reception beam to each mobile terminal by using a broadcast channel or the like. Herein, the power control variable $\Psi_n$ for the neighboring reception beam may include a value calculated using an angle $\theta_n$ with respect to a neighboring reception beam and a reception beam thereof. The power control variable $\Psi_n$ may include information indicating a difference in an interference for each neighboring reception beam given in Table 1.

The base station performs uplink scheduling at operation 602 to perform uplink resource allocation for mobile terminals that need signal transmission for each frame. The base station sorts mobile terminals allocated with uplink resources for each neighboring reception beam at operation 604 to identify a reception beam that is to be used and a reception beam that is not to be used.

The base station generates MAP for mobile terminals allocated with uplink resources for each neighboring reception beam at operation 606. The base station generates neighboring reception beam allocation information $S(n)$ at operation 608.

Thereafter, if a time for transmitting the MAP to mobile terminals arrives, the base station transmits the neighboring reception beam allocation information together with the MAP to the mobile terminals at operation 610. Herein, the neighboring reception beam allocation information may be included in the MAP in the form of one of the three configurations illustrated in FIGS. 3, 4, and 5.

At operation 612, the base station receives an uplink signal through a reception beam that is set in a frame set with a mobile terminal and terminates the entire process.

Hereinafter, operations of a mobile terminal according to an embodiment of the present disclosure will be described.

Figure 7:
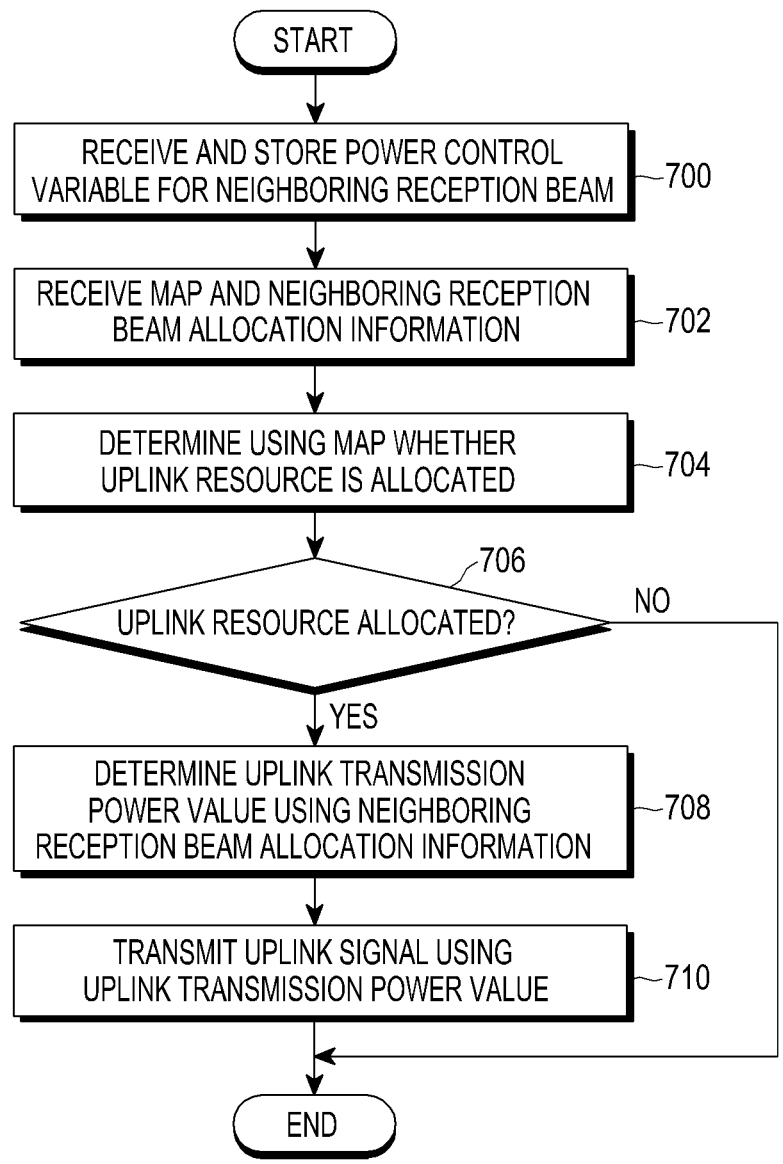
FIG. 7 is a flowchart illustrating a process of transmitting an uplink signal at a mobile terminal in a wireless communication system according to an embodiment of the present disclosure.

FIG. 7 is a flowchart illustrating a process of transmitting an uplink signal at a mobile terminal in a wireless communication system according to an embodiment of the present disclosure.

Referring to FIG. 7, at operation 700, the mobile terminal receives a power control variable $\Psi_n$ for a neighboring reception beam from a base station through a broadcast channel or the like and stores the received power control variable $\Psi_n$ for future uplink power control.

The mobile terminal receives the MAP and the neighboring reception beam allocation information at operation 702, and determines whether an uplink resource is allocated using the MAP at operation 704. If the uplink resource is allocated at operation 706, the mobile terminal determines an uplink transmission power value by using the power control variable $\Psi_n$ and the neighboring reception beam allocation information at operation 708. For this end, the mobile terminal may use the uplink power control equation expressed as Equation 5.

If a time for transmitting an uplink signal arrives, the mobile terminal transmits the uplink signal to the base station by using the determined uplink transmission power value at operation 710.

An internal structure of the base station and an internal structure of the mobile terminal according to an embodiment of the present disclosure will be described with reference to FIGS. 8 and 9.

Figure 8:
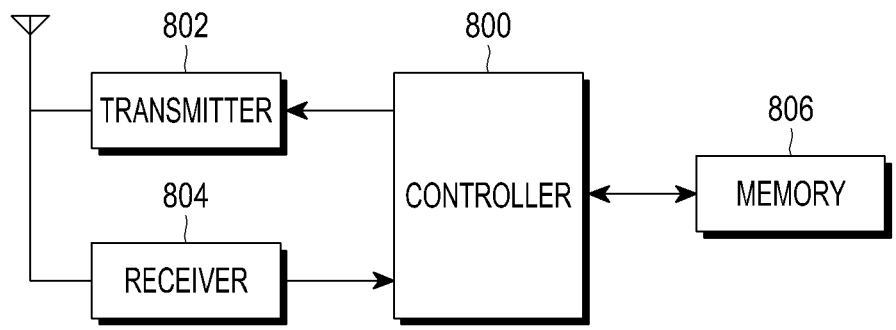
FIG. 8 is a block diagram of a base station for receiving an uplink signal in a wireless communication system according to an embodiment of the present disclosure.

FIG. 8 is a block diagram of a base station for receiving an uplink signal in a wireless communication system according to an embodiment of the present disclosure.

Referring to FIG. 8, the base station may include a controller 800, a transmitter 802, a receiver 804, and a memory 806.

The transmitter 802 and the receiver 804 are elements for communicating with a mobile terminal, and the memory 806 is an element for storing various information (for example, the MAP, the neighboring reception beam allocation information, or the like) generated corresponding to operations of the base station.

The controller 800 controls the overall operation of the base station by controlling the transmitter 802, the receiver 804, and the memory 806. More particularly, the controller 800 transmits a power control variable $\Psi_n$ for a neighboring reception beam to each mobile terminal by using a broadcast channel or the like. Herein, the power control variable $\Psi_n$ for a neighboring reception beam is a value calculated using an angle $\theta_n$ with respect to a neighboring reception beam and a reception gain for the angle $\theta_n$.

The controller 800 performs uplink scheduling to perform uplink resource allocation for mobile terminals that need signal transmission for each frame. The controller 800 sorts mobile terminals allocated with uplink resources for each neighboring reception beam, and identifies a reception beam that is to be used and a reception beam that is not to be used. The controller 800 then generates the MAP and the neighboring reception beam allocation information S(n) for the mobile terminals allocated for the reception beam that is to be used.

If a time for transmitting the MAP to mobile terminals arrives, the controller 800 transmits the MAP together with the neighboring reception beam allocation information to the mobile terminals. Herein, the neighboring reception beam allocation information may be included in the MAP in the form of one of the three configurations illustrated in FIGS. 3, 4, and 5. The controller 800 then receives an uplink signal through a set reception beam in a frame set with a corresponding mobile terminal.

Figure 9:
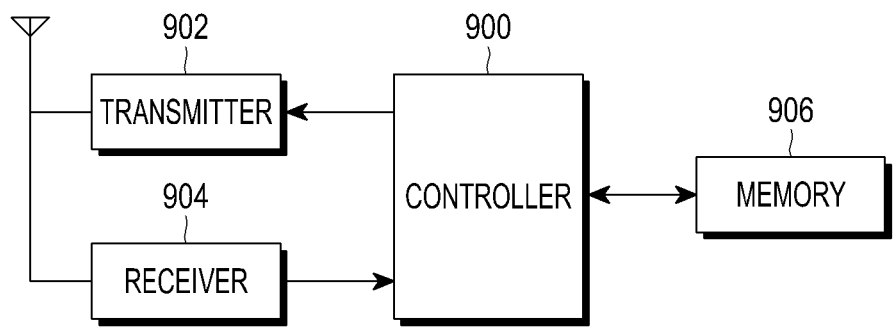
FIG. 9 is a block diagram of a mobile terminal for transmitting an uplink signal in a wireless communication system according to an embodiment of the present disclosure.

FIG. 9 is a block diagram of a mobile terminal for transmitting an uplink signal in a wireless communication system according to an embodiment of the present disclosure.

Referring to FIG. 9, the mobile terminal may include a controller 900, a transmitter 902, a receiver 904, and a memory 906.

The transmitter 902 and the receiver 904 are elements for communicating with the base station, and the memory 906 is an element for storing various information (for example, the power control variable, the neighboring reception beam allocation information, the MAP, and the like) generated corresponding to operations of the mobile terminal.

The controller 900 controls the overall operation of the mobile terminal by controlling the transmitter 902, the receiver 904, and the memory 906. More particularly, the controller 900 receives a power control variable $\Psi_n$ for a neighboring reception beam from the base station through a broadcast channel or the like, and stores the power control variable $\Psi_n$ for use in future uplink power control.

The controller 900 receives the MAP and the neighboring reception beam allocation information, and determines by using the MAP whether an uplink resource is allocated. If the uplink resource is allocated, the controller 900 determines an uplink transmission power value by using the power control variable $\Psi_n$ and the neighboring reception beam allocation information. To this end, the controller 900 uses the uplink power control equation expressed as Equation 5.

Thereafter, if a time for transmitting an uplink signal arrives, the controller 900 transmits the uplink signal to the base station by using the determined uplink transmission power value.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

The invention claimed is:

1. A method for transmitting an uplink signal by a first mobile terminal in a wireless communication system, the method comprising:
   receiving from a base station, a power control variable determined based on an interference value for a first reception beam used for reception of the uplink signal of the first mobile terminal among multiple reception beams of the base station;
   receiving from the base station, neighboring reception beam allocation information indicating whether to use other reception beams different from the first reception beam among the multiple reception beams for reception of the uplink signal;
   determining an uplink transmission power value based on the received power control variable and the received neighboring reception beam allocation information; and
   transmitting the uplink signal to the base station based on the determined uplink transmission power value.

2. The method of claim 1, wherein the interference value for the first reception beam is determined based on an angle between the first reception beam and at least one second reception beam that indicates at least one reception beam used for reception of the uplink signal of at least one second mobile terminal among the other reception beams.

3. The method of claim 1, wherein the neighboring reception beam allocation information comprises information indicating whether there exist mobile terminals that transmit uplink signals corresponding to the other reception beams different from the first reception beam in the same frame as a frame in which the first mobile terminal transmits the uplink signal.

4. The method of claim 1, wherein the neighboring reception beam allocation information comprises information indicating whether there exist mobile terminals that transmit uplink signals corresponding to reception beams in which mobile terminals transmitting the uplink signals exist among the other reception beams for each channel.

5. The method of claim 1, wherein the neighboring reception beam allocation information is included in resource allocation information and is broadcast to mobile terminals that transmit uplink signals corresponding to the first reception beam.

6. The method of claim 1, wherein the determining of the uplink transmission power value comprises:
   detecting at least one reception beam used for reception of the uplink signal among the other reception beams based on the neighboring reception beam allocation information;
   detecting the interference value for the at least one reception beam based on the received power control variable; and
   determining the uplink transmission power value based on the detected interference value.

7. The method of claim 1, wherein the power control variable comprises information indicating a difference in an interference for each of the multiple reception beams of the base station.

8. A method for receiving an uplink signal by a base station in a wireless communication system, the method comprising:
   determining a power control variable based on an interference value for a first reception beam used for reception of the uplink signal of a first mobile terminal among multiple reception beams of the base station;
   transmitting the determined power control variable to the first mobile terminal;
   transmitting to the first mobile terminal, neighboring reception beam allocation information indicating whether to use other reception beams different from the first reception beam among the multiple reception beams for reception of the uplink signal; and
   receiving the uplink signal transmitted based on an uplink transmission power value from the first mobile terminal, wherein the uplink transmission power value is determined based on the transmitted power control variable and neighboring reception beam allocation information.

9. The method of claim 8, wherein the interference value for the first reception beam is determined based on an angle between the first reception beam and at least one second reception beam that indicates at least one reception beam used for reception of the uplink signal of at least one second mobile terminal among the other reception beams.

10. The method of claim 8, wherein the neighboring reception beam allocation information comprises information indicating whether there exist mobile terminals that transmit uplink signals corresponding to the other reception beams different from the first reception beam in the same frame as a frame in which the first mobile terminal transmits the uplink signal.

11. The method of claim 8, wherein the neighboring reception beam allocation information comprises information indicating whether there exist mobile terminals that transmit uplink signals corresponding to at least one second reception beam for each channel.

12. The method of claim 8, wherein the neighboring reception beam allocation information is included in resource allocation information and is broadcast to mobile terminals that transmit uplink signals corresponding to the first reception beam.

13. The method of claim 8, wherein the uplink transmission power value is determined based on the interference value for at least one reception beam detected based on the neighboring reception beam allocation information used for reception of the uplink signal among the other reception beams, and
   wherein the interference value is detected based on the power control variable.

14. The method of claim 8, wherein the power control variable comprises information indicating a difference in an interference for each of the multiple reception beams of the base station.

15. A first mobile terminal in a wireless communication system, the first mobile terminal comprising:
   a receiver configured to receive from a base station, a power control variable determined based on an interference value for a first reception beam used for reception of an uplink signal of the first mobile terminal among multiple reception beams of the base station and neighboring reception beam allocation information indicating whether to use other reception beams different from the first reception beam among the multiple reception beams for reception of the uplink signal;
   a controller configured to determine an uplink transmission power value based on the received power control variable and the received neighboring reception beam allocation information; and
   a transmitter configured to transmit the uplink signal to the base station based on the determined uplink transmission power value.

16. The first mobile terminal of claim 15, wherein the interference value for the first reception beam is determined based on an angle between the first reception beam and at least one second reception beam that indicates at least one reception beam used for reception of the uplink signal of at least one second mobile terminal among the other reception beams.

17. The first mobile terminal of claim 15, wherein the neighboring reception beam allocation information comprises information indicating whether there exist mobile terminals that transmit uplink signals corresponding to the other reception beams different from the first reception beam in the same frame as a frame in which the first mobile terminal transmits the uplink signal.

18. The first mobile terminal of claim 15, wherein the neighboring reception beam allocation information comprises information indicating whether there exist mobile terminals that transmit uplink signals corresponding to reception beams in which mobile terminals transmitting the uplink signals exist among the other reception beams for each channel.

19. The first mobile terminal of claim 15, wherein the neighboring reception beam allocation information is included in resource allocation information and is broadcast to mobile terminals that transmit uplink signals corresponding to the first reception beam.

20. The first mobile terminal of claim 15, wherein the controller is further configured to detects at least one reception beam used for reception of the uplink signal among the other reception beams based on the neighboring reception beam allocation information, to detects the interference value for the at least one reception beam based on the received power control variable, and to determine the uplink transmission power value based on the detected interference value.

21. The first mobile terminal of claim 15, wherein the power control variable comprises information indicating a difference in an interference for each of the multiple reception beams of the base station.

22. A base station in a wireless communication system, the base station comprising:
   a controller configured to determine a power control variable based on an interference value for a first reception beam used for reception of an uplink signal of a first mobile terminal among multiple reception beams of the base station and to generate neighboring reception beam allocation information indicating whether to use other reception beams different from the first reception beam among the multiple reception beams for reception of the uplink signal;

a transmitter configured to transmit the determined power control variable and the neighboring reception beam allocation information to the first mobile terminal; and a receiver configured to receive the uplink signal transmitted based on an uplink transmission power value from the first mobile terminal, wherein the uplink transmission power value is determined based on the transmitted power control variable and neighboring reception beam allocation information.

23. The base station of claim 22, wherein the interference value for the first reception beam is determined based on an angle between the first reception beam and at least one second reception beam that indicates at least one reception beam used for reception of the uplink signal of at least one second mobile terminal among the other reception beams.

24. The base station of claim 22, wherein the neighboring reception beam allocation information comprises information indicating whether there exist mobile terminals that transmit uplink signals corresponding to the other reception beams different from the first reception beam in the same frame as a frame in which the first mobile terminal transmits the uplink signal.

25. The base station of claim 22, wherein the neighboring reception beam allocation information comprises information indicating whether there exist mobile terminals that transmit uplink signals corresponding to at least one second reception beam for each channel.

26. The base station of claim 22, wherein the neighboring reception beam allocation information is included in resource allocation information and is broadcast to mobile terminals that transmit uplink signals corresponding to the first reception beam.

27. The base station of claim 22, wherein the uplink transmission power value is determined based on the interference value for at least one reception beam detected based on the neighboring reception beam allocation information used for reception of the uplink signal among the other reception beams, and wherein the interference value is detected based on the power control variable.

28. The base station of claim 22, wherein the power control variable comprises information indicating a difference in an interference for each of the multiple reception beams of the base station.

* * * * *